Oct. 14, 1969

F. VIART 3,472,987

PROCESS FOR HEATING BY INDUCTION

Filed Aug. 29, 1966

INVENTOR
Fernand VIART
BY

ATTORNEY

INVENTOR
Fernand VIART
BY
Raymond A. [signature]
ATTORNEY

United States Patent Office 3,472,987
Patented Oct. 14, 1969

3,472,987
PROCESS FOR HEATING BY INDUCTION
Fernand Viart, Marcinelle, Belgium, assignor to Ateliers de Constructions Electriques de Charleroi (ACEC), Brussels, Belgium, and Vallourec, Paris, France
Filed Aug. 29, 1966, Ser. No. 575,750
Claims priority, application Belgium, Aug. 31, 1965, 668,976; July 13, 1966, 30,797
Int. Cl. H05b 5/08
U.S. Cl. 219—10.41                                     5 Claims

ABSTRACT OF THE DISCLOSURE

Process for the induction heating of adjacent edges of a metallic element wherein the said metallic element is folded to define the said two adjacent edges; the folded element is conveyed through induction loops arranged perpendicularly to the longitudinal axis of the metallic element; adjacent induction loops are connected to a source of high frequency current in such a manner that the currents in the said loops flow in opposite directions and wherein the induction loops are spaced from one another a distance which is sufficient for the currents induced in the metallic element to be forced to flow along the said adjacent edges whereby the latter are heated, the induced currents concentrating along the said edges by reason of their proximity and their opposite directions.

---

The present invention relates to a process permitting adjacent metallic edges to be heated by induction.

By induction heating process is to be understood processes that use electric currents at a suitable frequency which can vary from some thousands of cycles per second (medium frequency currents) to several hundreds of kilocycles per second or more (radio frequency currents); it is already known to use a process according to which one or several inductors are disposed along the edges to be heated and induce, in the said edges, currents that bring them to the desired temperature.

In practice, however, various disadvantages are met when using longitudinal inductors, particularly when they are used for continuous heating processes, in which the metallic edges to be heated move along in proximity to the inductors. Apart from the fact that the longitudinal inductors are subjected throughout their length to heat radiations of the heated edges, it is essential, if it is desired to obtain a uniform effect, for the geometric characteristics of the assembly comprising inductors and edges to remain constant. This condition is not always satisfied in the industrial installations, which causes variations in the quality of the manufactured products obtained by these processes.

It is also known, particularly in connection with the manufacture by continuous processes of longitudinally welded tubes by adjacent edges of a strip being brought together and welded, to use a process in which this previously curved strip is surrounded with a circular inductor; the currents induced by this type of inductor are developed in the back of the strip at right angles to the inductor and close along the edges to be heated and by the welding point.

In certain practical cases, however, such an arrangement cannot be used, either because the heating operation is not intended for preparing a welding operation, in which case there is no common point between the two edges to be heated, or because it is found to be necessary to position the inductor at such a distance from the point of contact that the desired heat effect is not achieved.

The present invention is concerned with a process which enable two adjacent metallic edges to be heated by induction while avoiding the use of longitudinal inductors and by overcoming certain disadvantages inherent in inductors placed transversely of the edges to be heated.

According to the invention, the process for the induction heating of adjacent edges of a metallic element comprises:

(a) Forming the metallic element so that it defines at least two adjacent edges, (b) Locating the formed element through induction loops disposed transversely to the longitudinal axis of and surrounding the formed element, (c) Connecting the induction loops to a source of current of high frequency in such a manner that current flows in opposite directions in two adjacent loops, the induction loops inducing in the metallic element underneath the induction loops electromotive forces of opposite directions underneath two adjacent loops, (d) Spacing the induction loops from one another a distance such that the induced electromotive forces naturally cause currents to flow in the metallic element along the adjacent edges from a region underneath one induction loop to a region underneath another induction loop, in opposite directions in the adjacent edges, to heat the edges by concentration of the current due to proximity effect.

The invention will now be disclosed with reference to the accompanying drawings which are to be taken for illustration purposes only and in which.

Figure 1:
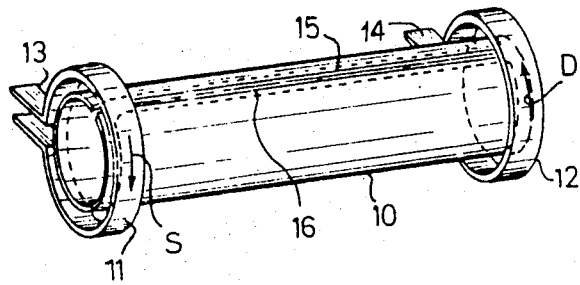
FIGURE 1 represents the application of the heating process of the invention to adjacent edges of a metallic blank in the form of a sleeve.

FIGURE 1 of the accompanying drawing represents the application of the heating process of the invention to adjacent edges of a metallic blank in the form of a sleeve. In this figure, 10 represents the sleeve-like metallic blank which is surrounded, perpendicularly of the longitudinal axis of the latter, by two circular inductors 11 and 12. These inductors are connected at 13 and 14 to electric current sources of suitable frequency, which supply currents in phase opposition, so that the electric currents supplied by the source connected at 14 are out of phase by 180° with respect to those delivered by the source connected at 13, this phase shift being symbolised by the arrows S and D shown in the drawing.

It is obvious that the electric current sources connected at 13 and 14 must be synchronous in order to respect the phase shift of the electric currents between the two inductors 11 and 12.

By an appropriate choice of the distance between the two inductors 11 and 12, as a function of the nature of the metal of the sleeve 10, the diameter of the latter and the frequency of the electric supply currents, the currents induced in the sleeve 10 by the inductors, opposite each inductor, are developed along the circuit indicated by a broken line in FIGURE 1, that is to say, they follow the two adjacent edges 15 and 16 (the currents induced along the edge 15 being in an opposite direction to those along the edge 16), where they are concentrated, thus bringing the edges 15 and 16 to the required temperature.

One particular advantage of the process of the present invention, particularly in continuous manufacturing processes requiring the generation in the metallic edges of a large quantity of energy in order to bring the said edges to the required temperature, resides in the possibility of using as large a number of inductors as may be necessary, the edges to be heated moving along in said inductors.

Figure 2:
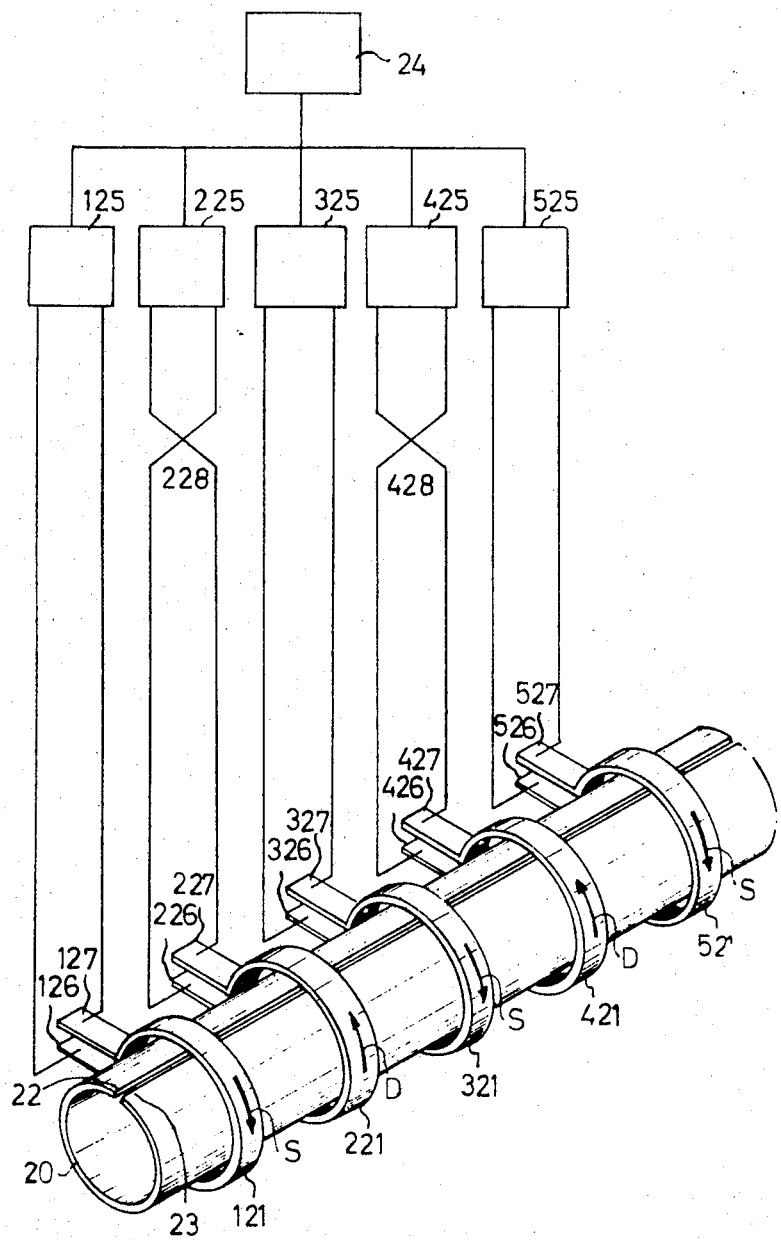
FIGURE 2 represents the application of the heating process for the continuous manufacture of a tube.

FIGURE 2 of the accompanying drawings represents the application of the process for the continuous manufacture of a tube which is welded longitudinally by edges of a strip being brought together and welded. In this figure, 20 represents a curved strip which moves successively through, for example, five circular inductors 121, 221, 321, 421 and 521; after heating to the required temperature, the edges 22 and 23 are brought together by a forging device (not shown) which is disposed after the inductor 521 in the direction of movement and are welded together.

The electric energy supply installation comprises, for example, when it is a question of high-frequency electric current, a pilot oscillator 24 which controls five power generators 125, 225, 325, 425 and 525; the control of the five generators 125 to 525 by the pilot oscillator 24 ensures that the currents generated by the power oscillators are in perfect phase agreement. The inductors 121 to 521 are connected to the power generators 125 to 525 by connections 126 and 127 for the inductor 121, connections 226 and 227 for the inductor 221, connections 326 and 327 for the inductor 321, connections 426 and 427 for the inductor 421 and connections 526 and 527 for the inductor 521, the connections to the inductors 221 and 421 being however crossed at 228 and 428. Inductors 121 to 521 are connected to sources of electric currents having an appropriate frequency so that the electric currents in the inductors have the direction represented by the arrows S and D, two successive inductors being fed by electric currents in phase opposition.

The use of inductors surrounding the metallic elements of which the edges are to be heated and which are disposed in a plane perpendicular to the longitudinal direction of these elements, or transverse inductors, have the advantage by comparison with longitudinal inductors that the constancy of the geometric characteristics of the inductor-edge assembly is not so imperative.

In addition, the formation of the transverse inductors according to the invention is more simple than that of longitudinal inductors, particularly on account of their design and the much weaker thermal stressing to which they are subjected.

Another particular advantage of the present invention is that the latter can be carried into effect for heating edges of metallic elements which have any non-circular cross-sectional form; in addition, the edges to be heated may be present in any number and they may occupy any position with respect to the transverse inductors. The transverse inductors may be shaped to conform to the section of the metallic elements which they surround or which travel through them.

Figure 3:
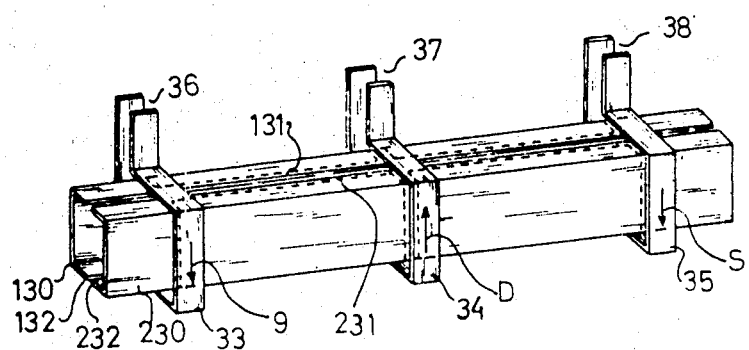
FIGURE 3 shows the application of the heating process to the continuous manufacture of square section metallic tubes.

FIGURE 3 of the accompanying drawings shows the application of the process according to the invention to the continuous manufacture of square-section metallic tubes by double longitudinal welding of two profile members of U-shape. In this figure, 130 and 230 represent two profile members of U-shape, of which the double longitudinal weld of the edges 131 and 231, on the one hand, and 132 and 232, on the other hand, by a forging device (not shown), leads to the formation of a square-section tube.

The two profile members 130 and 230 pass successively through for example three inductors 33, 34 and 35, of quadrangular form, disposed side-by-side perpendicularly of the direction of travel; these inductors are fed at 36, 37 and 38 with electric currents at suitable frequency, in such a way that the electric current circulating in two adjacent inductors are in phase opposition and have the direction indicated by the arrows S and D in the figure.

By appropriate adaptation of the geometrical and electrical characteristics of the means according to FIGURE 3, and especially the distance between the inductors, the currents induced in the profile members 130 and 230 opposite each inductor will be developed in such a manner that they will be concentrated respectively along the edges 131 and 231, on the one hand, and along the edges 132 and 232, on the other hand, following the broken lines indicated in the figure.

The elimination of the longitudinal inductors and the exclusive use of transverse inductors enables the process according to the invention to be applied to the heating of adjacent metallic edges, even in the case where the geometry of the inductor-edge assembly is not constant, particularly when the latter varies in a cyclic or non-cyclic manner.

Figure 4:
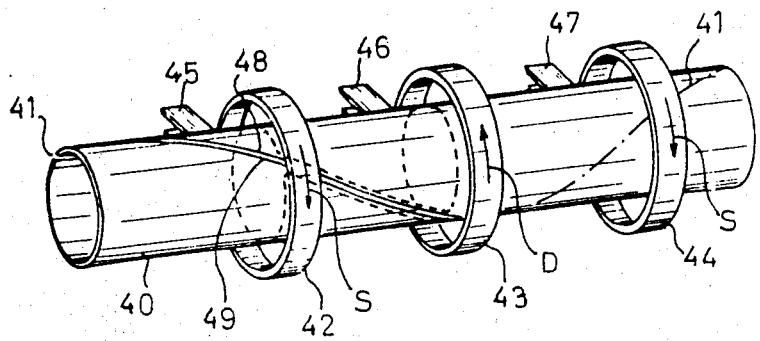
FIGURE 4 illustrates the heating process according to the invention applied to the manufacture of a tube from a helically twisted strip.

More particularly, the process according to the invention may be applied to the manufacture, by a continuous process, of a welded tube from a helically twisted strip, as shown in FIGURE 4 of the accompanying drawings.

In this figure, a strip 40 is twisted helically so as to form a practically closed tube having a slit 41 which describes a helix at the surface of the tube (represented by chain-dotted lines for the concealed part of the tube). The strip 10 moves successively through, for example, three transverse inductors 42, 43 and 44, which are connected at 45, 46 and 47 to electric current sources of suitable frequency, so that the inductor 43 is connected in phase opposition with respect to the inductors 42 and 44, the electric currents in these inductors having the direction indicated by the S and D in the figure. The strip 40 then passes through a forging device (not shown), in which the edges 48 and 49 and welded together.

It is obvious tht the generation of the currents induced in the metal of the strip 40 by the inductors 42, 43 and 44 is independent of the position of the slot 41 relatively to these inductors and that consequently the induced current will be developed as in the case of rectilinear edges, namely, these currents are concentrated along the edges 48 and 49 between the inductors 42 and 43 and between the inductors 43 and 44. The path of the currents induced between the inductors 42 and 43 are shown in FIGURE 4.

According to one feature of the invention, the process for heating by induction at least two adjacent edges of at least one metallic element is characterised in that the metallic element or elements are surrounded by at least two groups of inductors each comprising at least two inductors placed side-by-side at a certain distance from one another in a plane perpendicular to the longitudinal direction of the metallic element or elements, these groups of inductors being fed with electric currents of suitable frequency differing from one group of inductors to the other, in such a way that two adjacent inductors of a single group of inductors are fed by electric currents in phase opposition, the circuits of the currents induced in the metallic element or elements opposite each inductor being closed along the edges to be heated, where these induced currents are concentrated.

In the application of the process according to this feature of the invention illustrated in FIGURE 2 of the appended drawings, the inductors 121, 221 and 321 can be considered for instance as preheating inductors and the inductors 421 and 521 can be considered for instance as heating inductors; it is thus possible to supply these inductor groups with electric currents at different frequencies. For example, the inductors 121, 221 and 321 can be supplied with electric currents at a frequency of 10,000 cycles per second, while the inductors 421 and 521 can be supplied with electric currents at a frequency of 400 kilocycles per second.

It is obvious that in the case where use is made of two groups of inductors fed with electric currents at different frequency, the distance between the last inductor of one group and the first inductor of the other group must be such that the action of these inductors on the edges to be heated and which are situated between these two inductors is negligible, because of phenomena which will be produced on account of the difference in frequencies; the result thereof is that the condition of phase opposition between the last inductor of one group and the first inductor of the other group is not essential.

Another advantage of the present invention, in its application to continuous manufacturing processes, resides in the possibility of combining its effects with other which are already known per se.

According to this feature, the process for heating by induction at least two adjacent edges of at least one metallic element is characterised in that the metallic element or elements are first of all caused to travel through first inductors placed side-by-side at a certain distance from one another in a plane perpendicular to the longitudinal direction of the said metallic element or elements, these first inductors being supplied with electric currents at suitable frequency in such a manner that two adjacent inductors are fed with electric currents in phase opposition, the circuit of the currents induced in the metallic element or elements opposite each of these first inductors being closed between these inductors along the edges to be heated, where these induced currents are concentrated, and then through a last inductor positioned in a plane perpendicular to the longitudinal direction of the metallic element or elements, this last inductor being fed with electric currents at suitable frequency, the circuit of the currents induced in the metallic element or elements opposite this last inductor being closed beyond the said inductor along the edges to be heated, where these induced currents are concentrated.

According to this feature of the invention, the process for heating by induction at least two adjacent edges of at least one metallic element is characterised in that the metallic element or elements are first of all caused to travel through first inductors placed side-by-side at a certain distance from one another in a plane perpendicular to the longitudinal direction of the metallic element or elements, these first inductors being interconnected in such a way that two adjacent inductors are supplied in phase opposition, the circuit of the currents induced in the metallic element or elements opposite these first inductors being closed between these inductors, along the edges to be heated, where these induced currents are concentrated, and then through a last inductor placed in a plane perpendicular to the longitudinal direction of the metallic element or elements, the circuit of the currents induced in the metallic element or elements being closed beyond this last inductor, along the edges to be heated, where these induced currents are concentrated, the first inductor and the last inductor being fed with electric currents at suitable frequencies, this frequency differing from the group of the first inductors to the last inductor.

Figure 5:
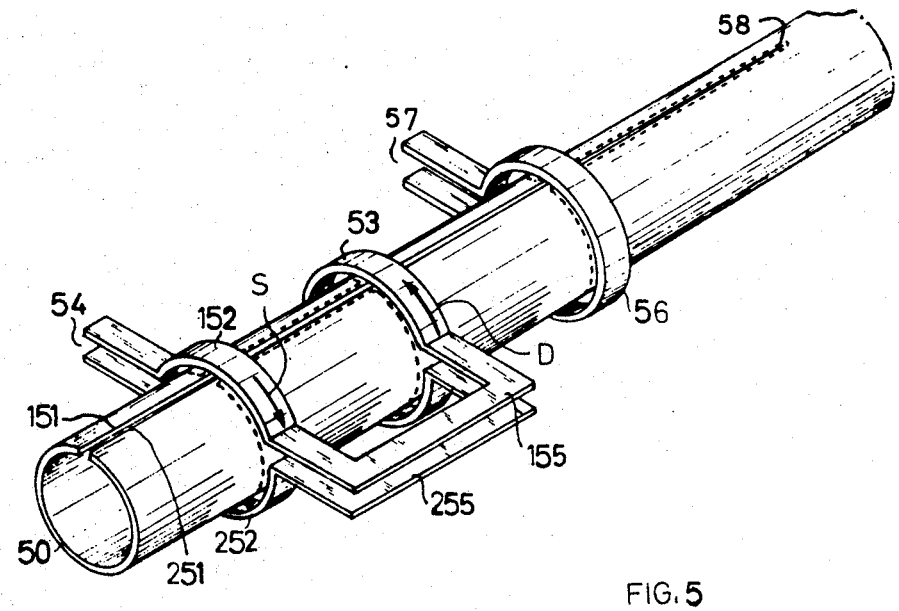
FIGURE 5 illustrates another embodiment of the invention further comprising a preheating inductor.

FIGURE 5 of the appended drawings illustrates the application of the process according to these features of the invention to the manufacture, in a continuous process, of a longitudinally welded tube by drawing together and welding the edges of the strip.

In this figure, 50 represents a strip which is curved a way as to provide two adjacent edges 151 and 251; it is surrounded first of all by a group of two inductors comprising two semi-inductors 152 and 252 and an inductor 53; the connection at 54 to an electric current source of suitable frequency is effected from the inductor 53 by the connections 155 and 255 through the two semi-inductors 152 and 252. The electric currents in the inductors 152–252 and 53 have the direction indicated by the arrows S and D in FIGURE 5 and are in phase opposition; the currents induced in the strip 50 opposite the inductors 152–252 and 53 are concentrated along the edges 151 and 251 between these inductors.

The strip 50 is then enclosed by an inductor 56 connected at 57 to an electric current source of suitable frequency; the currents induced by this inductor 56 follow the edges 151 and 251 of the strip 50 to beyond the inductor 56, for example, up to a welding point 58 where the two edges 151 and 251 are welded together by a forging device (not shown).

In the arrangement according to FIGURE 5, in which the inductors 152–252 and 53 can be considered as preheating inductors and the inductor 56 can be considered as a welding inductor, it is possible, when there is no common action of the inductors 53 and 56 on the zone contained between these two inductors, to use electric currents at different frequencies for supplying these inductors; for example, the inductors 152–252 and 53 can be fed with electric currents at a frequency of 10,000 cycles per second, while the inductor 56 can be supplied with electric currents at a frequency of 400 kilocycles per second.

According to a last feature of the invention, the process for heating by induction at least two adjacent edges of at least one metallic element is further characterised in that the metallic element or elements are caused to travel through inductors placed side-by-side at a certain distance from one another in a plane perpendicular to the longitudinal direction of the metallic element or elements, these inductors being fed with electric currents at suitable frequency in such manner that two adjacent inductors are fed by electric currents in phase opposition, the circuit of the currents induced in the metallic element or elements opposite each inductor being closed between two inductors placed side-by-side along the edges to be heated, and the circuit of the current induced in the metallic element or elements opposite the last inductor being in addition closed beyond this last inductor and along the edges to be heated, the induced currents being concentrated along these edges between the inductors and beyond the last inductor.

Figure 6:
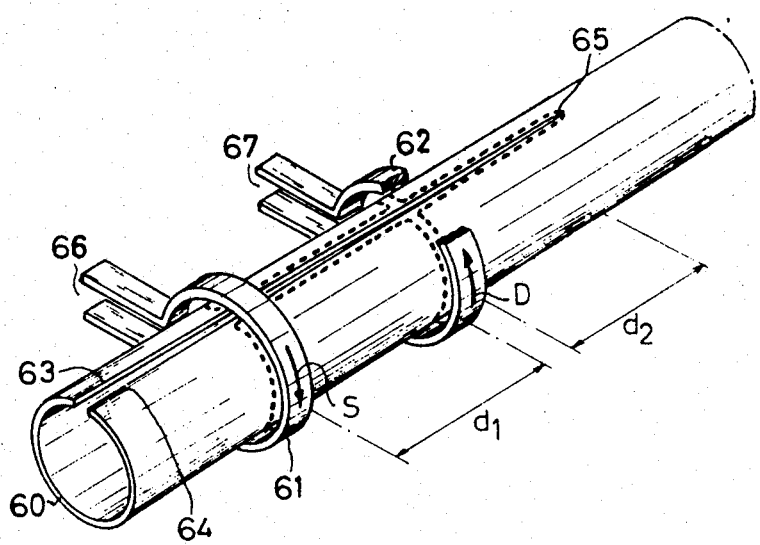
FIGURE 6 illustrates another embodiment of the invention in which the current induced in the metallic element by the last induction loop is caused to flow around a point where the two adjacent edges meet.

FIGURE 6 of the appended drawings represents the application of this last feature of the process according to the invention to the manufacture, in a continuous process, of a longitudinally welded tube by drawing together and welding the edges of the strip. In this figure, 60 represents a curved strip surrounded by two inductors 61 and 62 which are situated in front of, for example, a forging device (not shown) by which the edges 63 and 64 are applied one against the other at a point 65. The inductors 61 and 62 are connected at 66 and 67 to electric current sources of suitable frequency, which supply currents in phase opposition, this shift in phase being indicated by the arrows S and D of FIGURE 6.

By an appropriate selection of the distance $d_1$ and $d_2$ which respectively separate the two inductors 61 and 62 from one another and the inductor 62 from the point 65, it is possible to cause a distribution of the induced currents in the strip 60 in such a way that:

(a) Induced currents are concentrated along the edges 63 and 64, between the inductors 61 and 62;

(b) Induced currents are concentrated along the edges 63 and 64, beyond the inductor 62.

It is obvious that, in accordance with a technique which is known per se, the processes for heating by induction and described above can be used together with the use of controlled or uncontrolled magnetic cores, modifying the characteristics of the circuit of the induced currents and particularly the impedance of this circuit.

Similarly, it is obvious that the processes as above described are applicable to any form of heating by induction, whether this is particularly a static procedure or a question of continuous production; they are applicable to ferrous and non-ferrous metallic materials and also when the metallic elements are treated from the cold state or when they have been subjected to a previous preheating.

I claim:
1. Process for the induction heating of adjacent edges of a metallic element comprising:
    (a) forming said metallic elemnet so that it defines at least two adjacent edges,
    (b) locating said formed element through induction loops disposed transversely to the longitudinal axis of and surrounding said formed element,
    (c) connecting said induction loops to a source of current of high frequency in such a manner that current flows in opposite directions in two adjacent loops, said induction loops inducing in said element underneath said induction loops electromotive forces of opposite directions underneath two adjacent loops,
    (d) spacing said induction loops from one another a distance such that the induced electromotive forces naturally cause currents to flow in said element along the adjacent edges from a region underneath one induction loop to a region underneath another induction loop, in opposite directions in the adjacent edges, to heat said edges by concentration of the currents due to proximity effect.

2. Process as defined in claim 1 wherein induction heating is obtained by two groups of induction loops each comprising at least two induction loops, these groups of induction loops being fed with electric currents of frequencies differing from one group of induction loops to the other, two adjacent induction loops of a same group of induction loop being fed by electric currents in phase opposition.

3. Process as defined in claim 1 wherein induction heating is further obtained by an additional induction loop fed by electric currents at a suitable frequency, the circuit of the currents induced in the metallic element by the additional induction loop being closed beyond the additional induction loop along the edges to the heated where these induced currents are concentrated, and around a point where the adjacent edges meet.

4. Process as defined in claim 3 wherein the frequency of the electric currents fed to the additional induction loop is different from the frequency of the electric currents fed to the first induction loops.

5. Process as defined in claim 1 wherein the circuit of the currents induced in the metallic element by the last induction loop is in addition closed beyond the last induction loop, along the edges to be heated, where the induced currents are concentrated, and around a point where the adjacent edges meet.

References Cited

UNITED STATES PATENTS 2,852,649  9/1958  Limpel _____ 219—8.5

JOSEPH V. TRUHE, Primary Examiner

L. H. BENDER, Assistant Examiner

U.S. Cl. X.R.
219—8.5, 10.53